United States Patent
Destelle (10) Patent No.: US 9,658,339 B2
(45) Date of Patent: May 23, 2017

(54) METHOD FOR INTEGRITY MONITORING OF SATELLITE MEASUREMENTS

(71) Applicant: SAGEM DEFENSE SECURITE, Boulogne-Billancourt (FR)

(72) Inventor: Michel Destelle, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 448 days.

(21) Appl. No.: 14/529,059

(22) Filed: Oct. 30, 2014

(65) Prior Publication Data
US 2016/0154110 A1 Jun. 2, 2016

(30) Foreign Application Priority Data
Oct. 31, 2013 (FR) ..................................... 13 02529

(51) Int. Cl.
*G01S 19/20* (2010.01)
(52) U.S. Cl.
CPC .................................. *G01S 19/20* (2013.01)
(58) Field of Classification Search
CPC .......... G01S 19/20; G01S 19/49; G01S 19/33; G01S 19/47
USPC .................................................. 342/357.58
See application file for complete search history.

(56) References Cited

U.S. PATENT DOCUMENTS

| | | | |
|---|---|---|---|
| 9,146,322 B2 * | 9/2015 | Coatantiec | G01S 19/20 |
| 2013/0169478 A1 * | 7/2013 | Vourc'h | G01S 19/49 |
| | | | 342/357.58 |
| 2013/0249734 A1 * | 9/2013 | Najim | G01S 19/20 |
| | | | 342/357.58 |

FOREIGN PATENT DOCUMENTS

| | | |
|---|---|---|
| EP | 2 120 060 A1 | 11/2009 |
| EP | 2 428 818 A1 | 3/2012 |
| EP | 2706379 A1 * | 3/2014 ............ G01S 19/20 |
| FR | 2 964 468 A1 | 3/2012 |

* cited by examiner

*Primary Examiner* — Harry Liu
(74) *Attorney, Agent, or Firm* — Blakely Sokoloff Taylor & Zafman LLP (57) ABSTRACT

The invention relates to a method for integrity monitoring of a primary set of measurements obtained from navigation signals sent by satellites and provided to an integrity control device comprising a plurality of Kalman filters, the method comprising the steps definition, for each Kalman filter, of a secondary set of measurements contained in the primary set, calculation by each Kalman filter of a navigation solution from a respective secondary set of measurements, wherein definition of the secondary sets respects the following principles: each measurement contained in the primary set is present in at least one of the secondary sets, for each p-uplet of measurements of the primary set, p being a predetermined integer greater than 1, at least one of the secondary sets does not contain said p-uplet of measurements, for each secondary set, at least one of the p-uplets is excluded from said secondary set, the method further comprising the steps of: detection, for each navigation solution, of at most p faulty measurements not present in the secondary set from which the navigation solution is prepared, and signalling of at most p faulty satellites in the primary set from respective results of detections.

11 Claims, 3 Drawing Sheets

METHOD FOR INTEGRITY MONITORING OF SATELLITE MEASUREMENTS

FIELD OF THE INVENTION

The field of the invention is that of navigation systems radioguided by radionavigation satellites.

The invention relates more particularly to a method for integrity monitoring of measurements supplied by receivers of navigation signals sent by satellites to detect and exclude several simultaneous satellite failures, and a device adapted for executing such a method.

BACKGROUND OF THE INVENTION

Carriers such as aircraft or even ships have many navigation systems. Examples of these systems especially are hybrid INS/GNSS equipment (Inertial Navigation System and Global Navigation Satellite System).

An inertial measurement unit (IMU) supplies low-noise information which is precise and short-term. However, in the long term, location performances of an inertial measurement unit degrade (more or less quickly as a function of the quality of sensors, accelerometers or gyroscopes for example, and processing used by the unit). If the information acquired from a radionavigation system by satellites are as such highly unlikely to drift in the long term, they are however often noisy and vary in precision. Also, inertial measurements are always available whereas GNSS information is not or is likely to be fooled and scrambled.

The hybridisation consists of combining information provided by the inertial measurement unit and measurements provided by the navigation system by satellites to produce information on position and speed by capitalising on both systems. Therefore, the precision of measurements provided by the GNSS receiver controls the inertial drift and low-noise inertial measurements filter out noise on measurements of the GNSS receiver.

The model of GNSS measurements which is known fails to consider any satellite failures which affect clocks or ephemerides transmitted, these failures generally manifesting in the form of bias or drifts added to the GNSS measurements.

In these terms, the aim of systems for integrity monitoring is detecting the appearance of these failures and excluding the responsible satellites to find a navigation solution containing no more undetected error.

According to the prior art, a bank of Kalman filters is conventionally used to protect against any failure of a satellite. In a INS/GNSS context, each filter performs hybridisation between information originating from the navigation system by satellite and that originating from the inertial measurement unit, and prepares a navigation solution. These filters use only some of the GNSS measurements available (typically all GNSS measurements with the exception of those originating from one of the satellites, the excluded satellite being different from one filter to the other).

Figure 1:
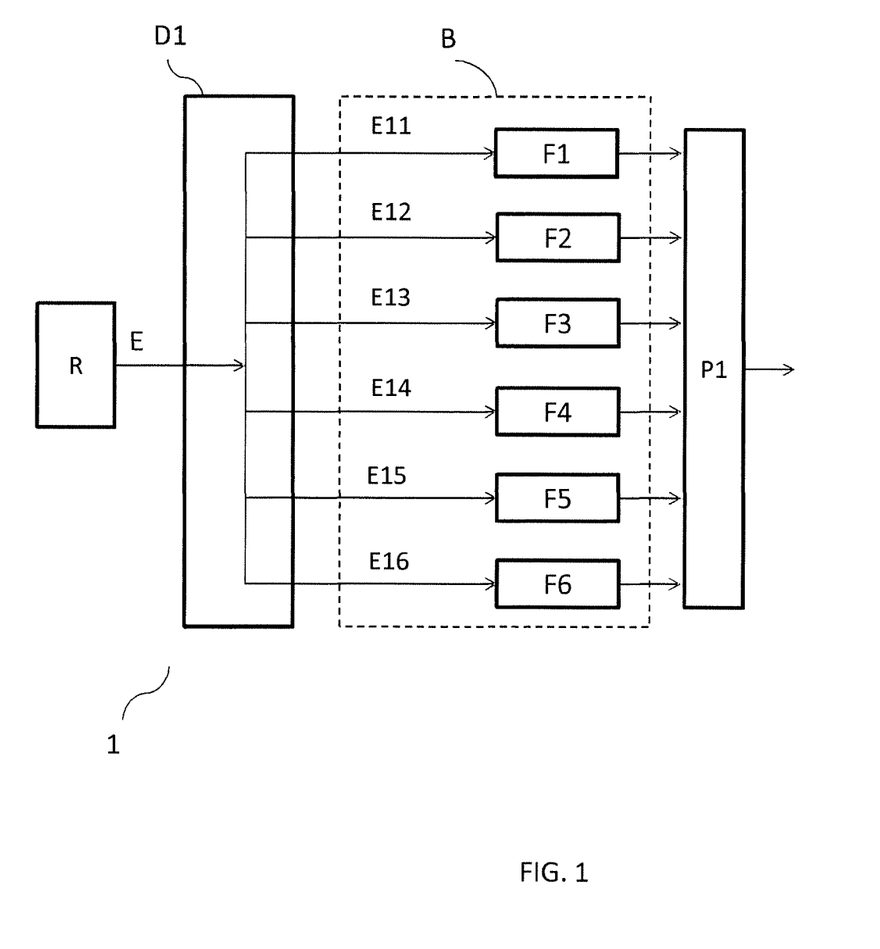
FIG. 1, already discussed, schematically illustrates a known navigation system.

FIG. 1 illustrates a navigation system 1 of the prior art adapted to carry out this principle.

The system 1 comprises a receiving module R adapted for acquisition of a primary set of measurements of signals emanating from radionavigation satellites, a data-processing unit D1, a bank B of Kalman filters F1-F6, and a decision-making unit P1.

The data-processing unit D1 provides each Kalman filter with a secondary set of respective measurements E11-E16, each secondary set comprising acquired measurements by exclusion of a specific measurement from the primary set.

If a satellite failure occurs, it is not viewed by the Kalman filter not receiving the measurement of the faulty satellite: this filter is therefore not affected by the failure and remains uncontaminated.

The decision-making unit P1 identifies the faulty satellite by comparing the measurements provided by the faulty satellite to estimations of these measurements prepared by each of the Kalman filters.

The satellite identified as being in failure can be excluded from the navigation solutions so as to cancel out pollution of the state of navigation by the satellite failure.

Now, multiplication of constellations of satellites dedicated to navigation (GPS, Galileo, Glonass for example) boosts the number of satellites which can be used in a hybrid INS/GNSS navigation system.

Therefore, future navigation systems requiring greater integrity will be restricted from having the capacity to detect and exclude more than one satellite failure.

In this aim, it is possible to adapt a bank of Kalman filters for detection and isolation of several simultaneous failures among N satellites.

For example, to detect two simultaneous satellite failures, one solution could consist of configuring each Kalman filter to process a respective subset of N−2 measurements of satellite signals, from which two measurements are excluded, each pair of excluded measurements being specific to a single Kalman filter.

Nevertheless, such a solution needs running a very large number of Kalman filters, that is, as many filters as couples of satellites selected from the N satellites in view, or $$C_N^2 = \frac{N(N-1)}{2}$$

filters. For example, for N=10, 45 filters are necessary; for N=20 there are 190 filters.

Presentation of the Invention

An aim to be achieved is that of performing integrity control of navigation measurements sent by satellites, which detects and excludes several simultaneous satellite radionavigation failures, but requires only a limited number of filters.

According to a first aspect, a method for integrity monitoring of a primary set of measurements obtained from navigation signals sent by satellites and provided to an integrity control device comprising a plurality of Kalman filters is therefore proposed, the method comprising the steps of:
  definition, for each Kalman filter, of a secondary set of measurements contained in the primary set,
  calculation by each Kalman fitter of a navigation solution from a respective secondary set of measurements,
the method being characterized in that definition of the secondary sets respects the following principles:
  each measurement contained in the primary set is present in at least one of the secondary sets,
  for each p-uplet of measurements of the primary set, p being a predetermined integer greater than 1, at least one of the secondary sets does not contain said p-uplet of measurements, for each secondary set, at least one of the p-uplets is excluded from said secondary set, and in that it further comprises the steps of:

detection, for each navigation solution, of at most p faulty measurements not present in the secondary set from which the navigation solution is prepared, and signalling of at most p faulty satellites in the primary set from respective results of detections.

The strategy of definition of secondary sets according to these rules maximises the number of measurements contained in each secondary set, to produce at the level of the corresponding filter Fl good performances in terms of precision and availability, performances directly linked to the number of measurements available per filter, and minimises the number of secondary sets.

The result is that the method for integrity monitoring proposed consumes, per number of satellites in view, a much lower number of Kalman filters than methods of the prior art described in the introduction. The cost of resources for calculating in the Kalman filters is minimised relative to the methods of the prior art.

Also, the method proposed is economical and simple to execute.

According to a second aspect, the invention also proposes an integrity control device adapted to execute the method according to the first aspect.

DESCRIPTION OF FIGURES

Other characteristics, aims and advantages of the invention will emerge from the following description which is purely illustrative and non-limiting, and which must be considered relative to the appended drawings, in which.

DETAILED DESCRIPTION OF THE INVENTION

Figure 2:
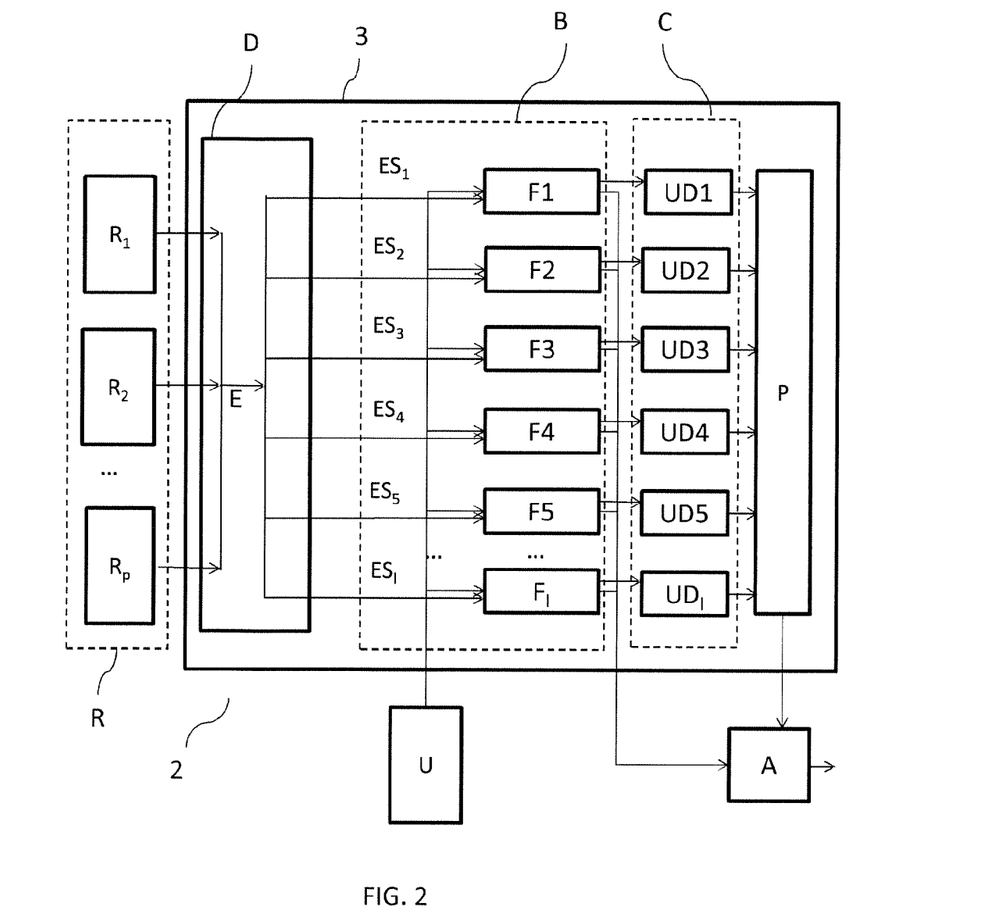
FIG. 2 schematically illustrates a navigation system according to an embodiment of the invention.

As illustrated in FIG. 2, a navigation system 2 comprises a module R for receiving satellite signals and a device for integrity monitoring 3 connected to the acquisition module.

The navigation system further comprises a consolidation unit A (that can optionally be included in the device for integrity monitoring 3 or not), and an inertial measurement unit U.

The receiving module R is adapted to acquire a plurality of measurements of radionavigation signals sent by satellites. For this purpose this module R can comprise p receivers $R_1, \ldots, R_p$, or sensors, each receiver or sensor being dedicated to the reception of radionavigation signals emanating from a respective satellite.

The integrity control device comprises a data-processing unit D, a bank B of Kalman filters, a bank C of failure-detection units, a primary decision-making unit P.

The data-processing unit D is configured to provide measurements acquired by the receiving module R at the Kalman filters; the way in which these measurements are selected by the processing unit D will be described later.

Conventionally, a "satellite measurement" is defined as an elementary group of navigation data emanating from a respective satellite that can be processed by at least one Kalman filter.

The bank B of Kalman filters comprises several filters $F_l$, l=1 to L, each filter receiving from the data-processing unit D a secondary set $ES_l$, l=1 to L, of respective satellite measurements. Each filter operates independently of the other filters, for example in parallel.

A detection unit $UD_l$, l=1 to L, belonging to the bank C of failure-detection units is linked to each filter $F_l$. Each detection unit $UD_l$ is connected to the output of a respective Kalman filter $F_l$ and also has access to the content of the primary set E.

Each detection unit $UD_l$ is configured to detect one or more satellite failures whereof the measurement is not present in the secondary set $ES_l$ processed by the Kalman index filter l placed upstream.

The internal operation of such detection units $UD_l$ is known per se, and therefore will not be described in detail. Detection units such as described in document EP1752786A1 can be provided, for example.

It is evident however that each detection unit UDi supplies a detection result in terms of comparison of measurements of the primary set E not present in ESi with estimations of these measurements prepared by the Kalman index filter i. The result of detection is typically a number of faulty measurements among the measurements of the primary set less than or equal to p, p being a predetermined integer in the device for integrity monitoring 3.

The decision-making unit P is adapted to identify and exclude one or more faulty satellites from all the detection results supplied by the detection units $UD_l$, l=1 to L belonging to the bank C. The decision made by the decision-making unit is typically a set of identifiers of faulty satellites (for example their PRN code), or else an empty set in the event of non-failure.

The consolidation unit A is configured to prepare a navigation solution consolidated from navigation solutions prepared by the Kalman filters $F_l$, l=1 to L, and from the decision delivered by the decision-making unit P.

Similarly, this consolidation unit A is configured to prepare protection limit calculations including the solutions of these sub-filters (see for example document EP 2006707 B1 for these notions).

The internal operation of such a consolidation unit is also known per se, and it will therefore not be detailed further.

The L Kalman fitters are referenced Fl-Fl, by way of example.

The number of filters of the device is determined prior to execution of the method for integrity monitoring whereof the steps will now be described.

In an embodiment, the detection units, the Kalman filters and the detection units and the consolidation unit are individual physical devices, for examples processors.

In another embodiment, the detection units, the Kalman filters and the detection units are logical units of a computer program executed by at least one processor.

Figure 3:
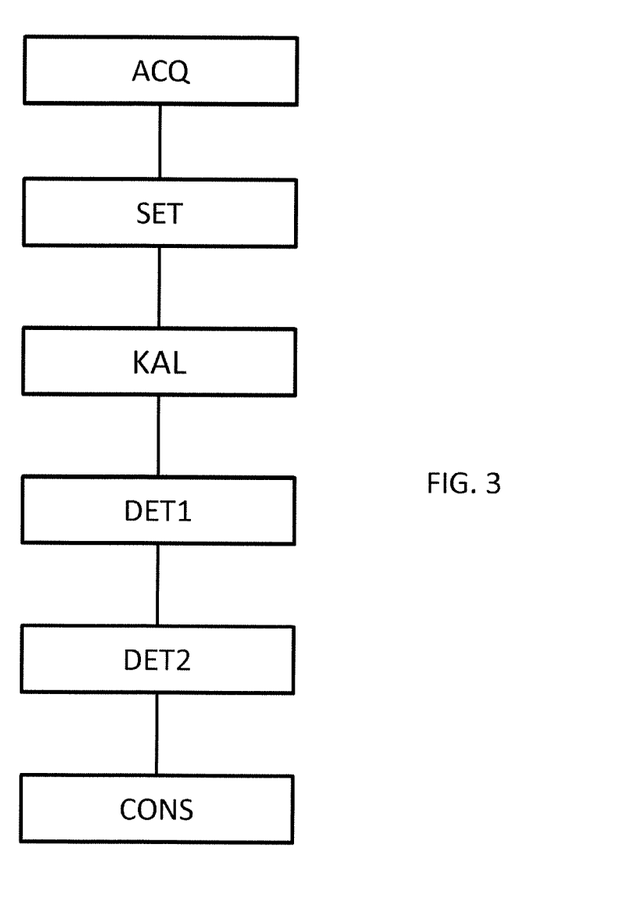
FIG. 3 illustrates the steps of a method for integrity monitoring according to an embodiment of the invention.

The steps of a method for integrity monitoring executed in the system of FIG. 2 are illustrated in FIG. 3.

In a preliminary step ACQ, the receiving module R acquires a so-called "primary" set E of n measurements $m_i$, i=1 to n of signals sent by radionavigation satellites, each measurement corresponding to a respective satellite.

In a step SET, the data-processing unit D determines, for each filter $F_l$, a respective secondary set $ES_l$ of measurements $m_i$ from the primary set E of measurements acquired.

In a step KAL, each Kalman filter $F_l$ calculates a respective navigation solution from a respective secondary set $ED_l$ of measurements. In the context of a hybridisation unit, each Kalman filter can take other measurements, for example measurements supplied by the inertial measurement unit U.

In a step DET1, each detection unit $UD_l$ detects one or more faulty measurements among the measurements not belonging to the secondary set $ED_l$ of measurements processed by the Kalman filter arranged upstream. These detections are preferably executed in parallel to reduce the processing time of measurements by the device for integrity monitoring 3, or else successively.

In a step DET2, the results of each detection unit $UD_l$ are processed by the decision-making unit P. From all these results, the decision-making unit signals the presence of faulty measurements in the primary set E of failures, and optionally identifies the corresponding faulty satellites.

For example, in the case of two simultaneous failures, a first failure is detected by a first detection unit, and a second failure is detected by a second detection unit during step DET1. In this case, during step DET2, these two sets of information are combined to conclude double failure. In practice, step DET2 can conduct comparison tests between error values and predetermined thresholds, these tests in turn being subject to failures. They are in fact statistical tests unable to be detected (missing detection) or detected incorrectly (in this case a false alarm). The thresholds used for conducting tests are adjusted to control these failures in a probabilistic manner. In this way, failures taken into account having probabilities of lacking detection and false alarm selected can be detected.

To filter such false alarms, temporary exclusion logic with expectation of confirmation of exclusion can be performed at the level of the module P. In other terms, each detection unit makes a "local" decision restricted to the measurements of the corresponding secondary set, white the module P makes an overall decision which utilises correspondence or not between local decisions taken by the UDi units and distribution of sets of measurements Esi, these subsets being carefully selected to allow the consolidation of decisions of detection units UDi for the majority of times.

The decision-making principles for detections of failure and faulty measurement exclusions prepared by the decision-making unit P rest on the following hypothesis:

It will be considered that a Kalman filter $F_l$ is sensitive to failure if it processes one or more measurements associated with this failure, The following conservative principle will be considered: a detection unit UDl linked to a fitter $F_l$ sensitive to a failure is itself faulty.

The principle of failure detection executed by the decision-making unit P can be the following: if at least one detection unit $UD_l$ linked to a filter Fl decides a failure detection, conservatively the decision-making unit will declare the presence of a failure, that this detection is decided with reason (a case where the $UD_l$ is not faulty) or that this detection is decided wrongly (a case where the $UD_l$ is faulty).

Other less conservative principles of failure detection can however be implemented by the decision-making unit P.

Also, the principle of exclusion of failure implemented by the decision-making unit P can be for example the following: if all detection units $UD_l$ associated with all filters Fl decide failure detection, conservatively we will declare the exclusion of this failure, whether these detections are decided with reason (a case where some $UD_l$ are not faulty) or these detections are decided incorrectly (a case where some $UD_l$ are faulty).

Other less conservative principles of failure exclusion can however be implemented by the decision-making unit P.

In a step CONS, the consolidation unit A prepares a navigation solution known as "consolidated" from navigation solutions supplied by the Kalman fitters and any measurements identified by the decision-making unit. The navigation solution is consolidated in the sense where it ensures the need for integrity for given probability of loss of integrity, for all cases of failure.

Determination of Secondary Sets for Hypothesis of Failures Limited to Simultaneous p Failures By way of preliminary step, the following principles will be considered.

$Es_l$ the secondary index set I will be considered as a subset of the set E.

A hypothesis for failure will be defined as a hypothesis of failure of one or more satellites. Measurements sent by faulty satellites according to the hypothesis in question could therefore correspond to a given failure hypothesis, a subset of measurements belonging to E.

$Ed_j$ of index j will be considered as a subset of the primary set E corresponding to measurements associated with the failure hypothesis j, a failure hypothesis corresponding to the simultaneous failure of these associated measurements.

$Ed_k$ of index k will also be considered as a set combining the sets $ed_j$ of index j for all failure hypotheses corresponding to the simultaneous failure of k satellite measurements.

$Ed_{cons\ j}$ of index j will be considered as a subset of E corresponding to measurements associated with the failure hypothesis of the constellation j, a failure hypothesis corresponding to the simultaneous failure of all measurements of satellites belonging to this $j^{th}$ constellation.

$Ed_{cons}$ will be considered as a set combining the sets $ed_{cons\ j}$ of index j for all constellation failure hypotheses.

According to different possible variants of steps DET1 and DET2, Ed will be considered as a set combining some of the sets $Ed_k$ of index k and possibly combining the set $Ed_{cons}$.

If for example the aim is to consider the failure hypothesis of a measurement from n measurements available, noted $m_1$, $m_2, \ldots, m_n$ the set $Ed_1$ will be considered as combining the n sets $ed_{1i}$ i of 1 to n sets with an element formed by the measurement i.

$$Ed_1 = \{\{ed_{11}\}, \{ed_{12}\}, \ldots, \{ed_{1n}\}\} = \{\{m_1\}, \{m_2\}, \ldots \{m_n\}\}$$

If for example the aim is to consider the failure hypothesis of two simultaneous measurements from n measurements available, the set $Ed_2$ will be considered as combining q sets containing each one of the couples of measurements i,j selected from m measurements, with $$q = C_n^2 = \frac{n(n-1)}{2}.$$

$$Ed_2 = \{\{ed_{21}\}, \{ed_{22}\}, \ldots \{ed_{2q}\}\}, \text{ with } q = C_n^2 = \frac{n(n-1)}{2}$$

$$\{\{m_1, m_2\}, \{m_1, m_3\}, \ldots \{m_1, m_n\},$$

$$\{m_2, m_3\}, \{m_2, m_4\}, \ldots \{m_2, m_n\},$$

$$\ldots$$

$$\{m_{n-2}, m_{n-1}\}, \{m_{n-2}, m_n\},$$

$$\{m_{n-1}, m_n\}\}.$$

In general, to consider the failure hypothesis of p simultaneous measurements from n measurements available, the set $Ed_p$ will be considered as combining q sets $e_{pq}$ containing each one of the p-uplets of measurements selected from n measurements with $$q = C_n^p = \frac{n!}{p!(n-p)!}.$$

$Ed_p=\{\text{set of q } ed_{pl}, \text{ with l=1 to q}\}$ with $$q = C_n^p = \frac{n!}{p!(n-p)!},$$

with $ed_{pl}=\{m_{pl1}, m_{pl2}, \ldots, m_{plp}\}$ with (pl1=1 to n), (pl2=1 to n), ..., (plp=1 to n) and with (pl1<pl2 ... <plq).

If for example the hypothesis of the overall constellation failure is considered, in the case where the system receives measurements from satellites belonging to nc constellations, the set $Ed_{cons}$ will be considered as combining the nc sets $Ed_{cons\ i}$ for i=1 to nc, each formed by the set of measurements of satellites belonging to the same constellation.

$$Ed_{cons}=\{ed_{cons\ 1}, ed_{cons\ 2}, \ldots, ed_{cons\ nc}\},$$

With $e_{cons\ i}$ {set of measurements of the constellation i}}. If for example the hypothesis is made that each constellation comprises 10 satellites in view, the first ten belonging to the first constellation, the following ten belonging to the second constellation, and so on until the nth constellation, there is:

$$Ed_{cons} = \{ed_{cons1}, ed_{cons2}, \ldots, ed_{consnc}\}$$
$$\{\{m_1, m_2, \ldots, m_{10}\},$$
$$\{m_{11}, m_{12}, \ldots, m_{20}\},$$
$$\ldots$$
$$\{m_{10*(nc-1)+1}, m_{10*(nc-1)+2}, \ldots, m_{10*nc}\}\}$$

Combining such sets can also be considered:
  Therefore if the aim is to consider the failure hypothesis of a measurement and also two simultaneous measurements, the set of sets of possibly faulty measurements is equal to the combining of sets $Ed_1$ and $Ed_2$.
  Therefore if the aim is to consider the failure hypothesis of a measurement, two simultaneous measurements and the overall constellation failure the set of sets of possibly faulty measurements is equal to the combining of sets $Ed_1$, $Ed_2$ and $Ed_{cons}$.

With these definitions considered, step SET determines the content of secondary sets according to some rules which will now be detailed.
  considering a primary set E of measurements $m_i$ i from 1 to n, $E=\{m_1, m_2, \ldots m_n\}$,
  considering secondary sets of measurements $ES_l$, l=1 to L each subset of E,
  considering a set Ed of a set of possibly faulty measurements $ed_i$, i=1 to q, each set of possibly faulty measurements ei being a subset of E, linked to a corresponding failure hypothesis i,
then the L secondary sets ES must respect the following principles.

First, for each measurement $m_i$, i from 1 to n, there is at least one secondary set $ES_l$, $1 \le l \le L$, comprising this measurement.

The justification of this first principle rests on the fact that if a measurement is not included in any secondary set, this measurement is useless.

Second, for each set of possibly faulty measurements edi, i from 1 to q there is at least one secondary set ESl, $1 \le l \le L$, which does not contain this set of measurements.

The justification of this second principle rests on the fact that for all failures taken into account, therefore for all sets $ed_i$, i from 1 to q of possibly faulty measurements, there is at least one secondary set $ES_l$, $1 \le l \le L$, which does not contain this set of possibly faulty measurements, therefore there is at least one filter $F_l$ associated with the secondary set $ES_l$ which remains insensitive (i.e. not faulty) to this failure.

Third, for each secondary set ESl, $1 \le l \le L$, there is at least one set of possibly faulty measurements edi, i from 1 to q which does not belong to this secondary set.

The justification of this third principle rests on the fact that if a secondary set $ES_l$, $1 \le l \le L$ is not insensitive to any failure $ed_i$, i from 1 to q, the filter $F_l$ linked to this secondary set contributes nothing in terms of integrity since it is still potentially faulty in case of failure.

The preparation strategy of these secondary sets $ES_l$, $1 \le l \le L$ according to these three principles maximises the number of measurements contained in each secondary set $ES_l$, $1 \le l \le L$, to produce at the level of the corresponding filter Fl good performances in terms of precision and availability, performances directly linked to the number of measurements available per filter, and minimises the number of secondary set ESl, $1 \le l \le L$, to give the lowest possible cost in calculation resources in the Kalman filters.

The principles mentioned hereinabove can be completed by means of optional principles.

A first optional principle can consist of each secondary set ESl, $1 \le l \le L$ comprising at least 3+nc measurements, with nc=the number of constellation GNSS to be taken into account. Hereinbelow, this first optional principle will be designated under the name "variant 1".

If the conservative hypothesis is made that the time biases associated with each of the constellations are independent variables, having at least $3+n_c$ measurements produces a solution for position, speed and time. This variant 1 therefore produces a solution for position, speed and time per filter Fl, $1 \le l \le L$ associated with the secondary sets $ES_l$, $1 \le l \le L$.

Also, a second optional principle can also be added, consisting for each measurement mi, i from 1 to n and for each set of possibly faulty measurements edj, j from 1 to q, of there being at least one secondary set ESl, $1 \le l \le L$, which contains neither this measurement mi, nor this set of possibly faulty measurements edj. Hereinbelow, this optional principle will be designated under the term "variant 2".

This variant 2 reinforces the principles of exclusions in case of failure detected. In fact, for a given measurement $m_i$, and for a given set of possibly faulty measurements $ed_j$, there is at least one filter $F_l$ linked to a secondary set $ES_l$ which is not faulty, therefore its associated detection unit $UD_l$, is not faulty, and it will therefore be capable of making a non-faulty decision corresponding to the measurement $m_i$. This is true for all measurements m i from 1 to m, and for each set of possibly faulty measurements $ed_j$, j from 1 to q.

For example, in the case of failure of a constellation of satellites (that is, when all satellites of this constellation are simultaneously faulty), and if two constellations are represented in the measurements of the primary set, the faulty constellation could not be identified. In the case of simultaneous breakdowns of a p-uplet of satellites, applying variant 2 reinforces identification of this p-uplet. In fact, for every measurement mj not belonging to this p-uplet there is in this case at least one Kalman filter $F_k$ of index k which contains neither this measurement mj nor this p-uplet. In this case, the detection unit UDk associated with the filter $F_k$ will declare (for a predetermined probability of false alarm) the measurement mj as valid.

Naturally, variants 1 and 2 can be cumulative in the same embodiment of the method for integrity monitoring.

Determination of Secondary Sets for Failure Hypotheses Limited to at Most 2 Simultaneous Failures Application of principles of preparation of secondary sets (and optional variants 1 and 2) in the event of failure hypotheses limited at most to 2 simultaneous satellite failures consists of considering p=2. In this case there is:

E: primary set E of measurements $m_i$ i from 1 to n, $E=\{m_1, m_2, \ldots m_n\}$, $ES_l$, l=1 to L: secondary sets of measurements $ES_l$, l=1 to L, each subset of E, Ed: set Ed of set of possibly faulty measurements $ed_i$, i=1 to n+n(n−1)/2, with:
  $ed_i$: subset of possibly faulty measurements for all hypotheses corresponding to a satellite failure or to two satellite failures,
  $ed_i=\{m_k\}$, for k=1 to n and for i=1 to n,
  $ed_i=\{m_k, m_l\}$, for k=1 to n, for l=1 to n, for k<l and for i=n+1 to n+n(n−1)/2/

The L secondary sets ES must respect the following principles:
  for each measurement mi, i from 1 to n, there is at least one secondary set ESl, 1≤l≤L, which considers this measurement;
  for each couple of measurements {mi, mj}, i from 1 to n, j from 1 to n there is at least one secondary set ESl, 1≤l≤L which does not contain this couple of measurements;
  for each secondary set ESl, 1≤l≤L, there is at least one couple of measurements {mi, mj}, i from 1 to n, j from 1 to n which does not belong to this set.

If variant 1 is used, each secondary set ESL, 1≤l≤L must comprise at least 3+nc measurements, with nc=the number of constellation GNSS.

If variant 2 is also used, for each triplet of measurements {mi,mj,mk}, i from 1 to n, j from 1 to n, k from 1 to n, i≠j≠k, there is at least one secondary set ESl, 1≤l≤L, which does not contain this triplet {mi,mj,mk}.

The set of principles to be applied for the sets of couple of measurements corresponding to the hypothesis of two simultaneous failures also covers the principles to be applied for the sets of simple measurement corresponding to the simple failure hypothesis.

Determination of Secondary Sets for Failure Hypotheses Limited to at Most p Simultaneous Failures Application of principles of preparation of secondary sets and optional variants in the event of failure hypothesis limited to at most p simultaneous satellite failures consists of considering more generally:

E: primary set E of measurements $m_i$ i from 1 to n, $E=\{m_1, m_2, \ldots m_n\}$, ESl, l=1 to L: secondary sets of measurements $ES_l$, l=1 to L, each subset of E, Ed: set Ed of set of possibly faulty measurements $ed_i$, i=1 to $C_n^1+C_n^2+\ldots+C_n^p$: with:
  $ed_i$: subset of possibly faulty measurements for all hypotheses corresponding to a satellite failure
  $ed_1\{m_{k1}\}$,
    for $k_1$=1 to n,
    for i=1 to $C_n^1$,
  $ed_i=\{m_k, m_{k2}\}$,
    for $k_1$=1 to n, for $k_2$=1 to n,
    for $k_1<k_2$,
    for $i=C_n^1+1$ to $C_n^1+C_n^2$,
  ...
  $ed_i=\{m_{k1}, m_{k2}, \ldots, m_{kp}\}$,
    for $k_1$=1 to n,
    for $k_2$=1 to n,
    ...
    for $k_p$=1 to n,
    for $k_1<k_2<\ldots<k_p$,
    for $i=C_n^1+C_n^2+\ldots+C_n^{p-1}$ to $C_n^1+C_n^2+\ldots C_n^p$.

The L secondary sets ES must respect the following principles.

For each measurement mi, i from 1 to n, there is at least one secondary set ESl, 1≤l≤L, which takes into account this measurement.

For each p-uplet of measurements {mk1, m k2, . . . , mkp}, for k1=1 to n, for k2=1 to n, . . . ,for kp=1 to n, k1≠k2≠ . . . ≠kp there is at least one secondary set ESl, 1≤l≤L, which does not contain this p-uplet of measurements.

For each secondary set ESl, 1≤l≤L, there is at least one p-uplet of measurements {mk1, m k2, . . . , mkp}, for k1=1 to n, for k2=1 to n, . . . , for kp=1 to n, k1≠k2≠ . . . ≠kp which does not belong to this set.

If variant 1 is used, each secondary set ESL, 1≤l≤L comprises at least 3+nc measurements, with nc=the number of constellation GNSS.

If variant 2 described previously is used, for any (p+1) uplet of measurements {mk1, m k2, . . . , mkp, mkp+1}, for k1=1 to n, for k2=1 to n, . . . , for kp=1 to n, for kp+1=1 to n k1≠k2≠ . . . ≠kp≠kp+1, there is at least one secondary set ESl, 1≤l≤L, which does not contain this (p+1) uplet {mk1, mk2, . . . , mkp, mkp+1}.

The principles to be applied for the p-uplets of measurements corresponding to the hypothesis of p simultaneous failures but also cover the principles to be applied for the sets of (p−1)-uplets corresponding to the hypothesis of p−1 simultaneous failures, and so on up to the principles to be applied for the sets of simple measurements corresponding to the hypothesis of simple failure.

Determination of Secondary Sets and Variants for Failure Hypotheses Limited to at Most Two Simultaneous Failures and Robust to Overall Constellation Failure Application of preparation principles of secondary sets and optional variants in the event of failure hypothesis limited to at most two simultaneous satellite failures, and also robust to the overall constellation failure consists of positing:

E: primary set E of measurements $m_i$ i from 1 to n, $E=\{m_1, m_2, \ldots m_n\}$, $E_l$, l=1 to L: secondary sets of measurements $ES_l$, l=1 to L, each subset of E, Ed: set Ed of set of possibly faulty measurements $ed_i$, i=1 to n+n(n−1)/2+$n_c$, with:
  $ed_i$: subset of possibly faulty measurements for all hypotheses corresponding to a satellite failure or to two satellite failures,
  $ed_i=\{m_k\}$, for k=1 to n and for i=1 to n,
  $ed_i=\{m_k, m_l\}$, for k=1 to n, for l=1 to n, for k<l and for i=n+1 to n+n(n−1)/2,
  $ed_i=\{$set of measurements of satellites of the constellation j$\}$, for j=1 to $n_c$, and for i=n+1 to n+n(n−1)/2+1 to n+n(n−1)/2+$n_c$, The L secondary sets ES must respect the following principles.

For each measurement mi, i from 1 to n, there is at least one secondary set ESl, $1 \leq l \leq L$, which takes into account this measurement.

For each couple of measurements {mi, mj}, i from 1 to n, j from 1 to n there is at least one secondary set ESl, $1 \leq l \leq L$, which does not contain this couple of measurements.

For each set of measurements of satellites of the constellation j, j from 1 to nc there is at least one secondary set ESl, $1 \leq l \leq L$, which does not contain this set.

For each secondary set ESl, $1 \leq l \leq L$, there is at least one couple of measurements {mi, mj}, i from 1 to n, j from 1 to n which does not belong to this secondary set.

For each secondary set ESl, $1 \leq l \leq L$, there is at least one set of measurements of satellites of the constellation j, j from 1 to nc which does not belong to this set.

If variant 1 of the method is applied, each secondary set ESl, $1 \leq l \leq L$ must comprise at least 3+nc measurements, with nc=the number of constellation GNSS to consider.

If variant 2 of the method is applied, then:

for each triplet of measurements {mi,mj,mk}, i from 1 to n, j from 1 to n, k from 1 to n, $i \neq j \neq k$, there is at least one secondary set ESl, $1 \leq l \leq L$, which does not contain this triplet {mi,mj,mk}, and For each couple of constellations i, j, i from 1 to nc, j from 1 to nc, $i \neq j$, there is at least one secondary set ESl, $1 \leq l \leq L$, which does not contain the set of measurements of satellites associated with this couple of constellations.

The set of principles to be applied for the sets of couple of measurements corresponding to the hypotheses of two simultaneous failures also covers the principles to be applied for the sets of simple measurement corresponding to the hypotheses of simple failure.

Practical examples of realisation of secondary sets, for particular configurations of execution of the method described previously, will now be described.

For each of these examples, a table showing the composition of each secondary set prepared will be presented, as a function of measurements present in the primary set. Each "X" will designate exclusion of a measurement of the primary set in a secondary set ESi.

First Embodiment

In a first embodiment, the parameters of execution of the method for integrity monitoring are the following:
Number of measurements: N=10.
Hypothesis of failure: 1 satellite failure.
Number of secondary set and Kalman filters: L=3.
Variant 1: Considered.
Variant 2: Not considered.

$$E=\{m_1, m_2, \ldots m_{10}\},$$

$$Ed=\{\{m_1\},\{m_2\}, \ldots \{m_{10}\}\}.$$

The composition of the secondary sets is the following:

| #measurement | $ES_1$ | $ES_2$ | $ES_3$ |
|---|---|---|---|
| 1 | X | | |
| 2 | X | | |
| 3 | X | | |
| 4 | | X | |
| 5 | | X | |
| 6 | | X | |
| 7 | | | X |
| 8 | | | X |
| 9 | | | X |
| 10 | | | X |

The method configured according to this first example is robust to failure; it executes integrity capable of detecting failure and excluding a navigation satellite with 3 filters each having 6 to 7 measurements available, in place of 10 filters made necessary in the solution with n filters discussed in the introduction.

Second Embodiment

In a second embodiment, the parameters for execution of the method for integrity monitoring are the following:
Number of measurements: 10,
Hypothesis of failure: 1 or 2 simultaneous satellite failures,
Number of secondary set and Kalman filters: L=10.
Variant 1: Considered.
Variant 2: Not considered.

$$E=\{m_1, m_2, \ldots m_{10}\},$$

$$Ed=\{\{m_1\},\{m_2\}, \ldots, \{m_{10}\},$$

$$\{m_1, m_2\}, \ldots, \{m_1, m_{10}\},$$

$$\{m_2, m_3\}, \ldots, \{m_2, m_{10}\},$$

$$\ldots$$

$$\{m_8, m_9\}, \ldots, \{m_8, m_{10}\},$$

$$\{m_9, m_{10}\}\}.$$

The composition of the secondary sets is the following:

| #measurement | $ES_1$ | $ES_2$ | $ES_3$ | $ES_4$ | $ES_5$ | $ES_6$ | $ES_7$ | $ES_8$ | $ES_9$ | $ES_{10}$ |
|---|---|---|---|---|---|---|---|---|---|---|
| 1 | X | | | X | | X | X | | | |
| 2 | X | | | X | | X | X | | | |
| 3 | | X | | | X | X | | X | | |
| 4 | | X | | | X | X | | X | | |
| 5 | X | | X | | | | | X | X | |
| 6 | X | | X | | | | | X | X | |
| 7 | | X | | X | | | | | X | X |
| 8 | | X | | X | | | | | X | X |
| 9 | | | X | | X | | X | | | X |
| 10 | | | X | | X | | X | | | X |

The method configured according to this second example is robust to a satellite failure and to two simultaneous satellite failures. It executes integrity capable of detecting up to two simultaneous failures and excluding up to two radionavigation satellites simultaneously with 10 filters each having 6 measurements available, in place of 45 filters made necessary in the solution with n*(n−1)/2 filters discussed in the introduction.

Third Embodiment

In a third embodiment, the parameters for executing the method for integrity monitoring are the following:
Number of measurements: N=20.
Number of constellations: nc=2.
Hypotheses of failure: 1 or 2 simultaneous satellite failures or 1 constellation failure.
Number of secondary set and Kalman filters: L=3.
Variant 1: Considered.
Variant 2: Not considered.

$$E = \{m_1, m_2, \ldots m_{10}\},$$

Measurements of the constellation 1: $\{m_1, m_2, \ldots, m_{10}\}$,
Measurements of the constellation 2: $\{m_{11}, m_{12}, \ldots, m_{20}\}$, $$Ed = \{\{m_1\}, \{m_2\}, \ldots, \{m_{10}\},$$

$$\{m_1, m_2\}, \ldots, \{m_1, m_{20}\},$$

$$\{m_2, m_3\}, \ldots, \{m_2, m_{20}\},$$

$$, \ldots,$$

$$\{m_{18}, m_{19}\}, \ldots, \{m_{18}, m_{20}\},$$

$$\{m_{19}, m_{20}\},$$

$$\{m_1, m_2, \ldots, m_{10}\}, \{m_{11}, m_{12}, \ldots, m_{20}\}\}.$$

The composition of the secondary sets is the following:

| #measurement | ES$_1$ | ES$_2$ | ES$_3$ |
|---|---|---|---|
| 1  |   | X | X |
| 2  |   | X | X |
| 3  |   | X | X |
| 4  |   | X | X |
| 5  |   | X | X |
| 6  |   | X | X |
| 7  |   | X | X |
| 8  | X |   | X |
| 9  | X |   | X |
| 10 | X |   | X |
| 11 | X |   | X |
| 12 | X |   | X |
| 13 | X |   | X |
| 14 | X |   | X |
| 15 | X | X |   |
| 16 | X | X |   |
| 17 | X | X |   |
| 18 | X | X |   |
| 19 | X | X |   |
| 20 | X | X |   |

The method configured according to this third example is robust to a satellite failure, to two simultaneous satellite failures, and to overall failure of one of the constellations. It executes an integrity capable of detecting up to two simultaneous failures and excluding up to two radionavigation satellites simultaneously with 3 filters each having 6 to 7 measurements available, in place of the 190 filters made necessary in the solution with n*(n−1)/2 filters discussed in the introduction.

Fourth Embodiment

In a fourth embodiment, the parameters for executing the method for integrity monitoring are the following:
Number of measurements: N=20.
Number of constellations: nc=2.
Hypotheses of failure: 1 or 2 simultaneous satellite failures or 1 constellation failure.
Number of secondary set and Kalman filters: L=10.
Variant 1: Considered.
Variant 2: Not considered.

$$E = \{m_1, m_2, \ldots m_{20}\},$$

Measurements of the constellation 1: $\{m_1, m_2, \ldots, m_{10}\}$,
Measurements of the constellation 2: $\{m_{11}, m_{12}, \ldots, m_{20}\}$, $$Ed = \{\{m_1\}, \{m_2\}, \ldots, \{m_{10}\},$$

$$\{m_1, m_2\}, \ldots, \{m_1, m_{20}\},$$

$$\{m_2, m_3\}, \ldots, \{m_2, m_{20}\},$$

$$, \ldots,$$

$$\{m_{18}, m_{19}\}, \ldots, \{m_{18}, m_{20}\},$$

$$\{m_{19}, m_{20}\},$$

$$\{m_1, m_2, \ldots, m_{10}\}, \{m_{11}, m_{12}, \ldots, m_{20}\}\}.$$

The composition of the secondary sets is the following:

| measurement | ES$_1$ | ES$_2$ | ES$_3$ | ES$_4$ | ES$_5$ | ES$_6$ | ES$_7$ | ES$_8$ | ES$_9$ | ES$_{10}$ |
|---|---|---|---|---|---|---|---|---|---|---|
| 1  | X |   | X | X | X |   |   |   |   |   |
| 2  | X |   | X | X | X |   |   |   |   |   |
| 3  | X |   | X | X | X |   |   |   |   |   |
| 4  | X |   | X | X | X |   |   |   |   |   |
| 5  | X |   |   |   |   | X | X | X |   |   |
| 6  | X |   |   |   |   | X | X | X |   |   |
| 7  | X |   |   |   |   | X | X | X |   |   |
| 8  | X |   |   |   |   | X | X | X |   |   |
| 9  | X |   |   |   |   |   |   |   | X | X |
| 10 | X |   |   |   |   |   |   |   | X | X |
| 11 |   | X | X |   |   | X |   |   | X |   |

-continued

| measurement | ES$_1$ | ES$_2$ | ES$_3$ | ES$_4$ | ES$_5$ | ES$_6$ | ES$_7$ | ES$_8$ | ES$_9$ | ES$_{10}$ |
|---|---|---|---|---|---|---|---|---|---|---|
| 12 | X | X |   |   | X |   |   |   | X |   |
| 13 | X | X |   |   |   | X |   |   | X |   |
| 14 | X |   | X |   |   |   | X |   | X |   |
| 15 | X |   |   | X |   |   | X |   | X |   |
| 16 | X |   |   | X |   |   | X |   |   | X |
| 17 | X |   |   |   | X |   |   | X |   | X |
| 18 | X |   |   |   | X |   |   | X |   | X |
| 19 | X |   |   |   | X |   |   | X |   | X |
| 20 | X |   |   |   | X |   |   | X |   | X |

The method configured according to this fourth embodiment is robust to a satellite failure and to two simultaneous satellite failures and to overall failure of a constellation; it executes integrity capable of detecting up to two simultaneous failures and excluding up to two radionavigation satellites simultaneously with 10 filters each having 10 to 13 measurements available, in place of 190 filters made necessary in the solution with n*(n−1)/2 filters discussed in the introduction.

The method for integrity monitoring is not limited to the cases in the embodiments described previously, but can of course be applied in all cases based on the principles and variants presented in the present document.

In general, the resulting secondary sets can have an equal number of measurements, or a different number.

The aim in all cases is to minimise the cardinal average of input sets of Kalman filters to balance the calculation load between the differents Kalman filters executed in parallel, and therefore prevent a Kalman filter from having to process a navigation solution from a large number of measurements relative to the other filters and stowing down detection and isolation of failures.

The number of secondary sets prepared can be fixed, or can be variable. The number of secondary sets can for example vary as a function of the number of satellites in view.

A computer program product comprising program code instructions for execution of the steps of the method described, when this programme is executed by a data-processing unit of a navigation system, can also be executed.

The invnetion claimed is:

1. A method for integrity monitoring of a primary set (E) of measurements obtained from navigation signals sent by satellites and provided to a device (3) for integrity monitoring comprising a plurality of Kalman filters, the method comprising the steps of:
   definition (SET), for each Kalman filter, of a secondary set (ES$_1$-ES$_L$) of measurements contained in the primary set (E),
   calculation (KAL) by each Kalman filter of a navigation solution from a respective secondary set of measurements,
wherein the definition (SET) of the secondary sets (ES$_1$-ES$_L$) respects the following principles:
   each measurement contained in the primary set (E) is present in at least one of the secondary sets (ES$_1$-ES$_L$),
   for each p-uplet of measurements of the primary set, p being a predetermined integer greater than 1, at least one of the secondary sets (ES$_1$-ES$_L$) does not contain said p-uplet of measurements,
   for each secondary set (ES$_1$-ES$_L$), at least one of the p-uplets is excluded from said secondary set,
the method further comprising the steps of:
   detection (DET1), for each navigation solution, of at most p faulty measurements not present in the secondary set from which the navigation solution is prepared, and
   signalling (DET2) of at most p faulty satellites in the primary set (E) from respective results of detections.

2. The method for integrity monitoring according to claim 1, wherein each secondary set (ES$_1$-ES$_L$) comprises at least 3+n$_c$ measurements of the primary set (E), n$_c$ being a predetermined number of constellations to which the satellites send signals giving the measurements of the primary set (E) belong.

3. The method for integrity monitoring according to claim 1, wherein, for each individual measurement of the primary set (E) and for each p-uplet of measurements of the primary set (E), there is at least one secondary set (ES$_1$-ES$_L$) containing neither this individual measurement nor this p-uplet of measurements.

4. The method for integrity monitoring according to claim 1, wherein the definition (SET) of the secondary sets (ES$_1$-ES$_L$) respects the following principles for any integer k between 1 and p:
   for each k-uplet of measurements of the primary set (E), at least one of the secondary sets does not contain said k-uplet of measurements,
   for each secondary set, at least one of the k-uplets is excluded from said secondary set.

5. The method for integrity monitoring according to claim 1, wherein the signalling step (DET2) signals a failure from results of detections, if at least one of the results of first detection reports at least one failure.

6. The method for integrity monitoring according to claim 1, wherein the signalling step (DET2) reports one or more satellites to be excluded, if all the results of detections each report at least one failure.

7. The method for integrity monitoring according to claim 6, further comprising a preparation step (CONS) of a navigation solution consolidated from navigation solutions prepared (KAL) by the Kalman filters and from the result of the signalling step (DET2).

8. A device for integrity monitoring (3) of a primary set of measurements obtained from navigation signals sent by satellites, the device comprising:
   a data-processing-unit (D) configured to define a plurality of secondary sets of measurements each forming a subset of the primary set,
   a bank (B) of Kalman filters (F1-Fl), each Kalman filter being configured to prepare a navigation solution from a respective secondary set,
wherein the data-processing unit (D) is configured to define the secondary sets according to the following principles:
   each measurement contained in the primary set is present in at least one of the secondary sets, for each p-uplet of measurements of the primary set, p being a predetermined integer greater than 1, at least one of the secondary sets does not contain said p-uplet of measurements, and for each secondary set, at least one of the p-uplets is excluded from said secondary set, wherein the device for integrity monitoring further comprise:

a bank (C) of detection units (UD1-UDl), each detection unit being arranged at output of a respective Kalman filter and configured to detect at most p faulty satellites each corresponding to a measurement not present in the secondary set processed by said Kalman filter, p being greater than 1, a decision-making unit (P) configured to signal at most p faulty satellites from detection results prepared by the detection units (UD1-UDl).

9. A navigation system (2) comprising a plurality of receivers (R1-Rp) of vigation signals sent by satellites, a device (3) according to claim 8 adapted for controlling the integrity of a primary set of satellite navigation measurements acquired by the plurality of receivers (R1-Rp), and a consolidation unit (A) configured to prepare a consolidated navigation solution and protection limits from navigation solutions prepared by the Kalman filters (F1-Fl) and faulty satellites signalled by the decision-making unit (P).

10. The navigation system (2) according to claim 9, wherein the consolidation unit (A) is further configured to prepare protection limits from navigation solutions prepared by the Kalman filters (F1-Fl) and faulty satellites signalled by the decision-making unit (P).

11. Computer program product comprising program code instructions for execution of the steps of the method according to any one of claims 1 to 7, when this program is executed by a data-processing unit.

* * * * *

UNITED STATES PATENT AND TRADEMARK OFFICE
CERTIFICATE OF CORRECTION

PATENT NO. : 9,658,339 B2
APPLICATION NO. : 14/529059
DATED : May 23, 2017
INVENTOR(S) : Michel Destelle It is certified that error appears in the above-identified patent and that said Letters Patent is hereby corrected as shown below:

In the Claims

Column 15, in the introduction to Claim 1, Line 45, please delete "invnetion" and insert --invention--.

Column 17, Claim 9, Line 18, please delete "vigation" and insert --radionavigation--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*